United States Patent [19]
Epstein

[11] Patent Number: 5,257,157
[45] Date of Patent: Oct. 26, 1993

[54] PROTECTOR NETWORK FOR A-C EQUIPMENT

[76] Inventor: Barry M. Epstein, 1400 S. Sherman #202, Richardson, Tex. 75081

[21] Appl. No.: 519,180

[22] Filed: May 4, 1990

[51] Int. Cl.$^5$ .......................... H02H 9/00; H02H 1/04
[52] U.S. Cl. ...................................... 361/111; 361/56; 361/119; 333/185
[58] Field of Search .................. 361/111, 56, 91, 119; 333/167, 181, 185, 12; 174/36

[56] References Cited
U.S. PATENT DOCUMENTS

| | | | |
|---|---|---|---|
| 3,736,437 | 5/1973 | Nabae et al. | 307/93 |
| 4,259,705 | 3/1981 | Stifter | 361/56 |
| 4,301,428 | 12/1981 | Mayer | 333/12 |
| 4,675,772 | 6/1987 | Epstein | 361/56 |
| 4,843,356 | 6/1989 | Lusignan et al. | 333/12 |

Primary Examiner—A. D. Pellinen
Assistant Examiner—Ronald W. Leja
Attorney, Agent, or Firm—Terry M. Gernstein

[57] ABSTRACT

The protector network disclosed in U.S. Pat. No. 4,675,772 is improved by omitting a specific inductor element from the filter means disclosed in that patent. The improved protector network is also used in a building having a main breaker panel or service entrance and subpanels.

27 Claims, 5 Drawing Sheets

PROTECTOR NETWORK FOR A-C EQUIPMENT

TECHNICAL FIELD OF THE INVENTION

The present invention relates to the general art of protective apparatus for a-c equipment, and to the particular field of protecting electronic apparatus from damaging power surges and transients.

BACKGROUND OF THE INVENTION

There are many applications where it is necessary to protect a-c load equipment from power surges and voltage transients which could deleteriously affect and possibly damage such equipment. This protection is particularly important for equipment comprising highly sensitive or complex multiple loads susceptible to electrical noise. For example, modern sophisticated data processing equipment includes highly sensitive electronic components which are particularly susceptible to damage or loss of stored data therein due to reactive voltage spikes occurring as a result of power surges in the feeder lines, switching transients, or as a consequence of external causes such as lightning or corona discharges or merely due to the internal circuitry itself. Some of these conditions can also occur with respect to, and thus damage, sophisticated telecommunication and telephone equipment installations.

Numerous types of protective networks have been designed in an attempt to protect such equipment from these power surges and transients; but most of these existing protective networks have not been entirely satisfactory for all conditions of service. Specifically, it would be desirable that such protective networks be adapted for convenient installation with existing equipment, prevent the deleterious effects of such surges and transients occurring at the source, or as a consequence of the circuit breaker switching, as well as being effective to prevent reactive spike build-up or other spikes or noise at the load side of the network. This is especially true in many modern buildings where there are numerous electronic components, especially PC's, connected to one subpanel. In fact, it is not uncommon to have several thousand PC's in a single office building. Thus, the inventor has found that one source of noise and spikes can be a computer itself. The large number of PC's, printers, etc in many modern office buildings can make the building load generated noise a major problem. Furthermore, it would be desirable to provide such surge and transient protection in synergistic combination with power filtering, as well as to adapt such protective networks for convenient installation with, and therefore protection of, multiple type loads, i.e. 3-phase and single-phase loads.

One protective network that has been effective is disclosed in U.S. Pat. No. 4,675,772, the disclosure of which is incorporated herein by reference. This network provides power surge and transient voltage protection for a-c load equipment, and is illustrated in FIG. 1. The network 10 illustrated in FIG. 1 includes an L-C filter portion 11 and a pair of voltage suppressors 12 and 13. The voltages suppressors 12 and 13 are connected across lines 14 and 15 supplying a-c power to input terminals 1 and 2 of a load 16. As shown, the filter network 10 includes an inductor 11a and a capacitor 11b and is located between the suppressors 12 and 13.

While the network disclosed in the incorporated patent works extremely well, it does introduce some costs into an overall system. Thus, reducing the costs associated with the protector network disclosed in the incorporated patent would further improve that network.

Accordingly, there is a need for a protector network for a-c equipment which has a minimum cost, yet is still as effective as the network disclosed in U.S. Pat. No. 4,675,772, and which can be incorporated in a building.

OBJECTS OF THE INVENTION

It is a main object of the present invention is to provide a protector network for a-c equipment which has a minimum cost.

It is another object of the present invention to provide a protector network for a-c equipment which has a minimum cost, yet is still as effective as the network disclosed in U.S. Pat. No. 4,675,772.

It is another object of the present invention to economically distribute building protection throughout a building.

It is another object of the present invention to economically distribute building protection throughout a building and to provide filtering between various sensitive loads in the building or workspace.

SUMMARY OF THE INVENTION

These, and other, objects are achieved by a protector network for a-c equipment which improves the network disclosed in U.S. Pat. No. 4,675,772 by removing the inductor element 11a from the network.

Line inductance of the line conductor 14 is used in place of the actual inductor element 11a of the incorporated patent. The line 14 is of sufficient length to have a line inductance between the suppressors 12 and 13 which is effectively equivalent to the inductance 11a existing in the filter network 10 of the incorporated patent.

BRIEF DESCRIPTION OF THE DRAWING FIGURES

FIG. 1 is a schematic diagram illustrating the prior art network disclosed in U.S. Pat. No. 4,675,772 and which includes an inductor 11a in a filter network 10.

DETAILED DESCRIPTION OF THE PREFERRED EMBODIMENT OF THE INVENTION

Figure 1:
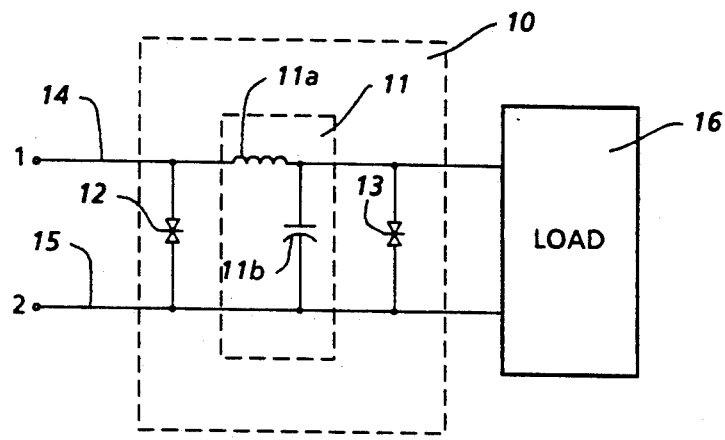
Figure 2:
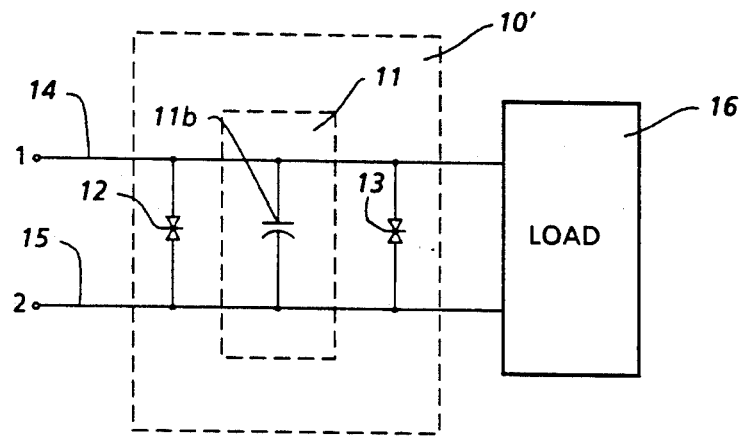
FIG. 2 is a schematic diagram illustrating an improved form of the network shown in FIG. 1.

Comparing FIGS. 1 and 2, it can be seen that the present invention is embodied in the use of self-inductance of the line 14 in place of the inductor 11a shown in FIG. 1. The filter network 10' shown in FIG. 2 is identical to the filter network 10 shown in FIG. 1 with the exception of the deletion of inductor 11a.

The self-inductance of the line 14 is selected to be essentially similar to, or in many cases, better than, the inductance associated with inductor 11a. The self-inductance of the line 14 is a function of the outer diameter of the line, the length of the line, the material of the line as well as the proximity of line 14 to other lines. For example, in a multi-line system, the flux linkage associated with line inductance can be determined by relationships such as: $= [L]i$, where is an $n \times 1$ vector containing $_1, _2, \ldots _n$; i is an $n \times 1$ vector containing $i_1, i_2, \ldots i_n$, and [L] is an $n \times n$ matrix whose general entry is $l_{ij} = (/2)\ln(1/D_{ij})$ henry/m, with $i,j = 1,2, \ldots n$, and $D_{ij} = r_{ij}'$, the geometric mean radius of a thin walled conductor. Tables of geometric mean radii or calculational techniques, such as disclosed in the Appendix of "Power System Analysis" by Charles A. Gross, and published by John Wiley and Sons in 1979 (which Appendix is incorporated herein by reference) can be used to determine the value of the inductance existing between suppressors 12 and 13. The line 14 is thus effective to provide the inductance necessary to achieve the results taught in the referenced patent so the overall network effectively suppresses power surges, voltage transients, spikes and the like from both the source and the load.

The inventor has found that even sixty feet of number 2 wire (medium-big) appears to provide enough inductance to be of value. In most buildings, the distance from a main panel to a subpanel is greater than sixty feet, and hence the inventor has found that inductance provided by the self-inductance of a line complying with National Electric Code Standards is sufficient to carry out the objects of the present invention.

Figure 3:
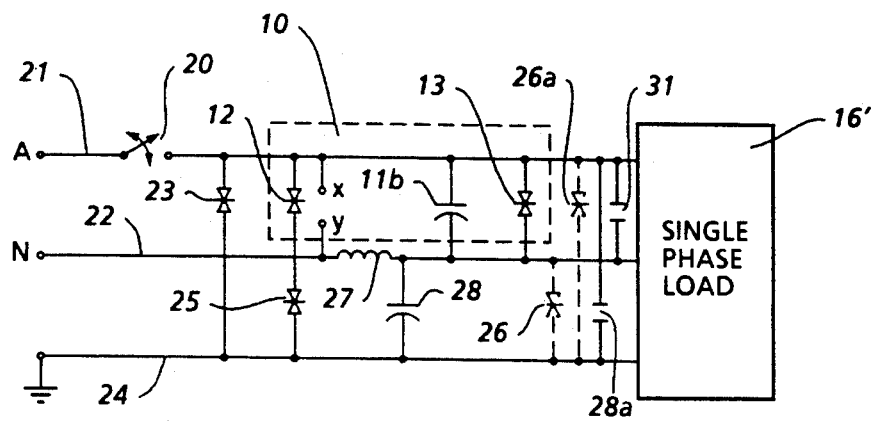
FIG. 3 is a schematic illustrating the improved network in conjunction with a single phase load.
Figure 4:
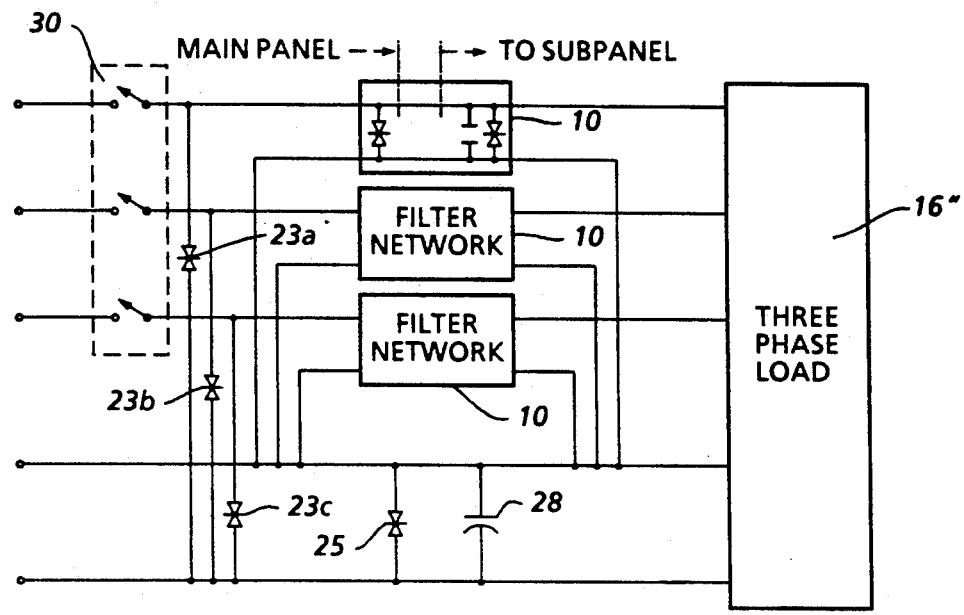
FIG. 4 is a schematic illustrating the improved network in conjunction with a three phase load.

Shown in FIGS. 3 and 4, is the network of the present invention in conjunction with a single phase load (FIG. 3) and in conjunction with a three phase load (FIG. 4). The various elements shown in FIGS. 3 and 4 are discussed in the incorporated patent, and attention is directed thereto for such discussion.

Shown in FIGS. 5-8 are applications of the present invention for use in a building. With a plurality of protection units connected to the supply lines or bus bar risers, such as bar BR, at various locations in the building being shown in FIGS. 6-8. As discussed in the referenced U.S. Pat. No. 4,675,772, the protection units and devices located on the load side of the network will protect the protection units and elements on the line side of the network against voltage surges initiated at the load side of the network. A suppressor 12' can be located in the building main circuit breaker panel 50 which joins the building wiring 14 and 15 to a utility power source 52. Lines 54 and 56 represent building wiring that extends from the main breaker panel throughout the building and which connect the utility or source power to loads, such as load 16', which are located at various places throughout the building, such as on various floors of a multi-story building, or the like.

Suppressor 13 and capacitor 11b are located in a subpanel 58 which can be located on the floor which contains the load 16', and the overall filter network 10' is comprised of the line 14, with its self-inductance replacing the inductor 11a, the subpanel 58 with its capacitor 11b and its suppressor 13, and the main breaker panel with its suppressor 12.

Alternatively, the elements shown may be located at other strategic positions by being attached directly to wire elements 14 and 15 as needed.

Figure 5:
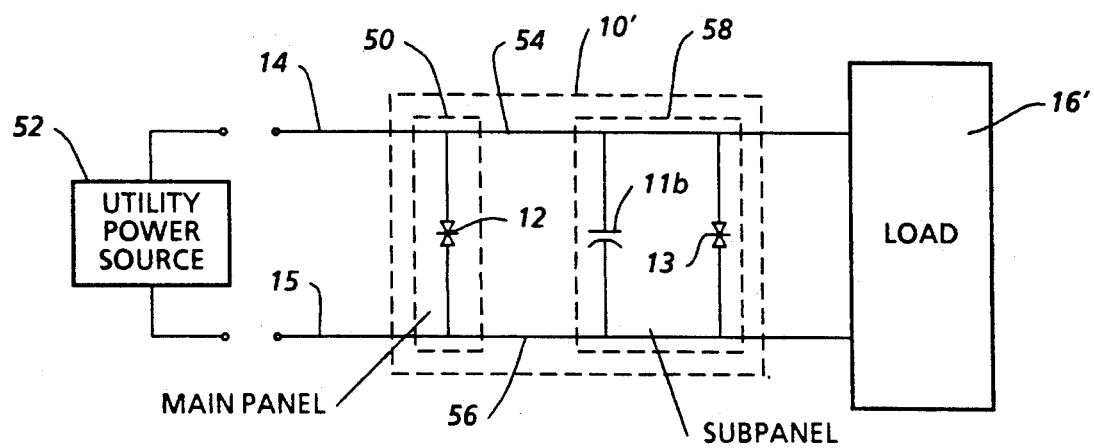
FIG. 5 is a schematic illustrating the improved network in conjunction with a building installation in which a load receives power from a utility via a junction box.
Figure 6:
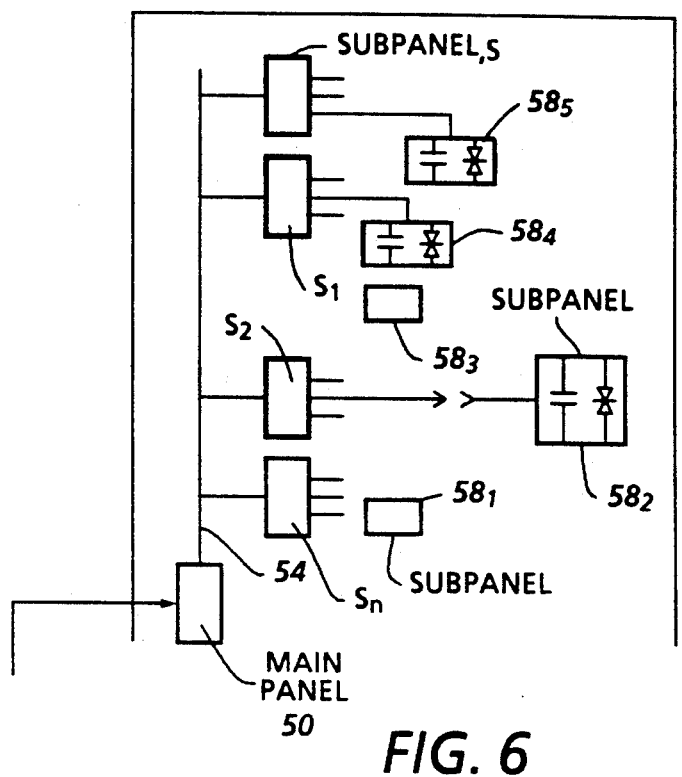
FIG. 6 illustrates a building which contains a plurality of point-of-use panels connected to a main panel by a bus bar riser.

An alternative form of the FIG. 5 setup is shown in FIG. 6 where the main panel 50 at a power service entrance connects the building bus bar riser 54 to various point-of-use panels, such as panels $S-S_n$, which includes a subpanel power surge and transient protector unit, shown as subpanels $58_1$ through $58_n$, with each subpanel corresponding to the just-described subpanel 58. Some of the subpanels are connected to the point-of-use subpanels to protect all equipment associated with that point-of-use subpanel, and some of the subpanels, such as subpanel $58_2$, can be spaced from the point-of-use subpanel to provide additional protection for special elements.

Figure 7:
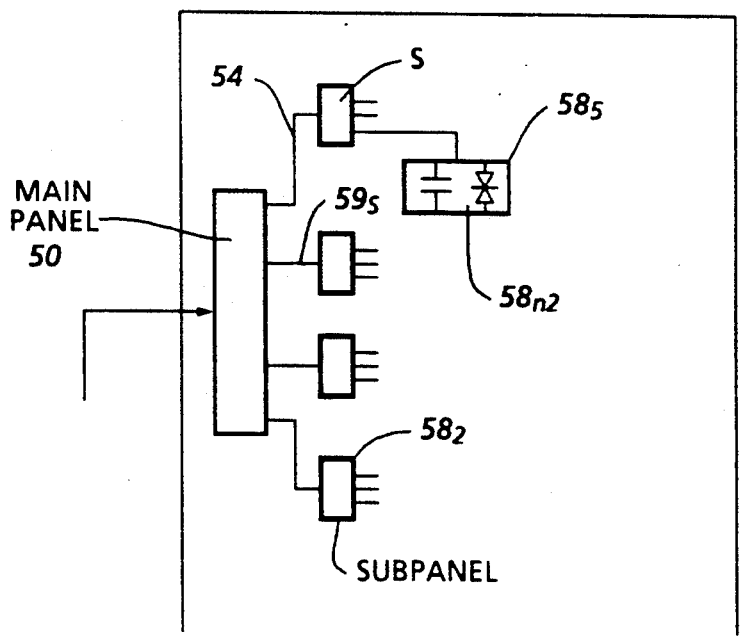
FIG. 7 illustrates a building which contains a plurality of point-of-use panels connected to a main panel by separate wiring.
Figure 8:
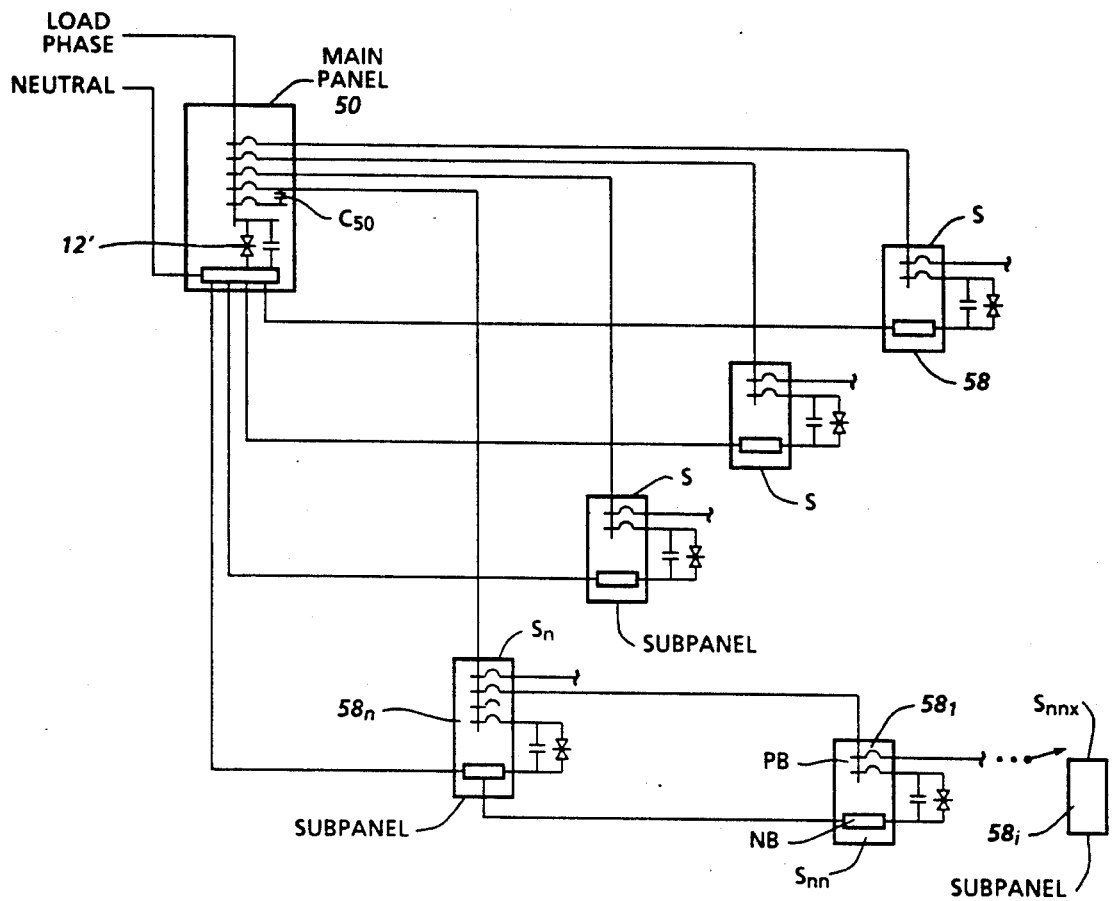
FIG. 8 illustrates a building which contains a plurality of point-of-use panels connected to each other and to a main building panel.

While FIG. 6 shows a bus bar riser set up, FIGS. 7 and 8 show each of the point-of-use panels S being connected to the main panel 50 via line conductors, such as line conductor $59_5$. In such a set up, each point-of-use panel is fed by a separate line from the main breaker panel. As shown in FIG. 8, a second point-of-use panel $S_{nn}$ reiterates a point-of-use panel $S_n$. Further point-of-use panels $S_{nnx}$ can be connected to the reiterative point-of-use panels as indicated in FIG. 8. Each point-of-use panel includes its own protective network 58, as is indicated for network $58_{n2}$. As can be seen in FIG. 8, each point-of-use panel is filter protected and each has the neutral bus NB thereof connected to the adjacent panel neutral buses, and the phase bus PB thereof connected to the phase buses of adjacent panels.

The arrangement of multiple filter elements such as shown in FIGS. 6 and 8 is also effective to provide noise filtering and suppression between various loads, such as those on different panels. A capacitor $C_{50}$ can be included at the main panel 50. This further enhances filtering between loads on various ones of the panels, and especially if sensitive loads are also connected the main panel 50 which could be upset by the summation of noise generated by the loads at various subpanels. Capacitors similar to $C_{50}$ can be included in each of the reiterative point-of-use panels as suitable.

Figure 9:
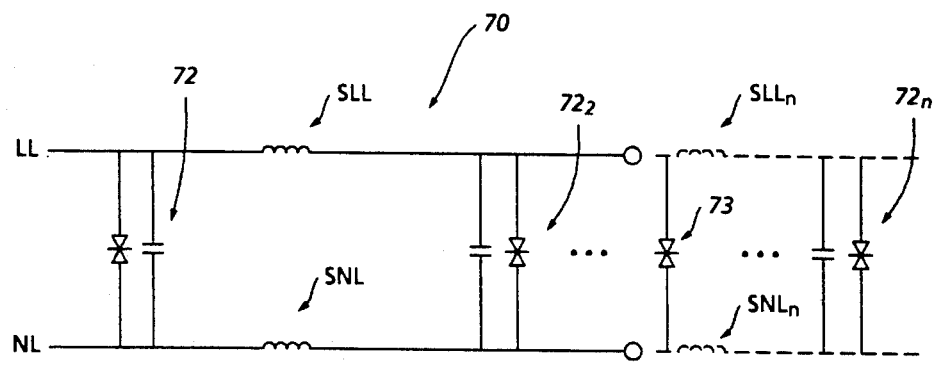
FIG. 9 illustrates a cascade or multiple tandem network in which several filter networks are connected between a load line and a neutral line with the self-inductance of the load and neutral lines forming the inductive element in the filter network as disclosed in the referenced patent.

Shown in FIG. 9 is a cascade network 70 in which a plurality of filter networks $72$, $72_2$ are connected in tandem between a load line LL and a neutral line NL with the self-inductance SNL and SLL serving as the inductance element disclosed in the incorporated patent as discussed above. Other filter networks $72_n$ can be connected to the lines LL and NL with self-inductance $SLL_n$ and $SNL_n$ being included. As is shown in FIG. 9, various other protective elements can also be included in the overall system, such as MOV 73, or the like. This permits various protective networks to be combined. This is especially important if the overall protective network is used in a building where several different modes of protection are, or can be, used.

Figure 10:
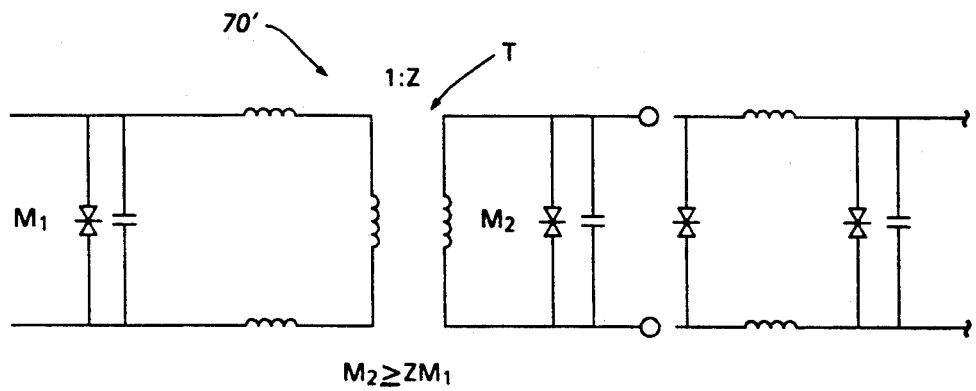
FIG. 10 illustrates a network which contains a transformer having a transformer ratio and in which the value of the voltage suppressors on one side of the transformer are related to the value of the voltage suppressors on the other side of the transformer by the value of the transformer ratio.
Figure 11:
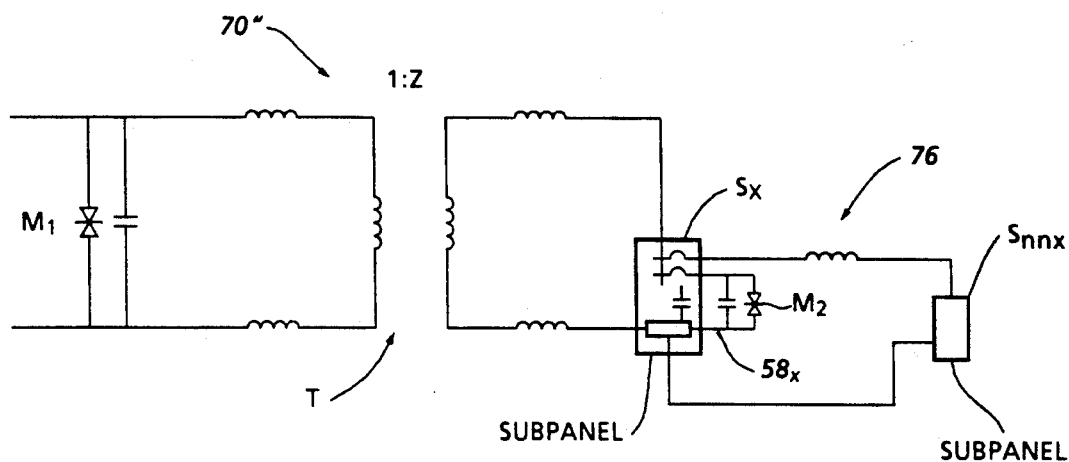
FIG. 11 illustrates a network similar to the transformer-containing network shown in FIG. 10 and which includes several point-of-use panels, each of which can include a filter network.

The cascade concept is shown in FIGS. 10 and 11 as networks 70' and 70" as including a transformer T in each network. The transformer has a transformer ratio 1:Z, and each of the networks 70' and 70" has suppressor elements, such as suppressor element $M_1$ on one side of the transformer and suppressor element $M_2$ on the other side of the transformer. The suppressor elements on each side of the transformer are related to each other by the transformer ratio. That is, all of the $M_2$ side suppressors are related to all of the $M_1$ side suppressors by the relationship $M_2 > ZM_1$. This feature permits the transformer-containing networks, such as networks 70' and 70", to carry out the aforediscussed load side and supply side protection. This relationship also permits this feature to be retained while accounting for voltage suppressor manufacturing tolerances. The voltage suppressor elements M can be, for example, MOV's. Using this relationship having the line side suppression level lower than the load side suppression level for the values of the voltage suppressors on each side of the transformer results in the line side suppressor or suppressors turning on before the load side suppressors.

The transformer-containing network 70" includes a reiterative panel setup similar to the setups discussed above in relation to FIG. 8. Thus, the network 70" includes a point-of-use panel $S_x$ connected to a filter panel $58_x$ having a suppressor $M_2$ connected between the phase and neutral buses thereof. Further point-of-use panels $S_{nnx}$ can be connected to each other and to the panel $S_x$ as above discussed.

As will occur to those skilled in the art based on the teaching of the above disclosure, the present invention can be used in conjunction with single phase power, multi-phase power, as well as between phase-to-phase, phase-to-neutral, phase-to-ground, as well as phase-to-ground situations. The various forms of protective networks can be combined in any suitable and desirable combination to provide a maximum protection to electrical equipment located in a building. Various combinations of voltage suppressors, filter means, and capacitors can thus be formed to provide an overall system that includes a portion thereof already built into a building. Thus, a building can be initially designed to provide overall protection, and the various tenants in the building can modify or complement that in situ building protection as desirable and suitable for their own needs. On the other hand, a building tenant may not desire to add any further protection, and will be protected by the in situ network already in place in the building. For example, the assignee of the present invention manufactures several different types of power protection equipment, and any or all of these various types of power protection equipment could be used in conjunction with a building in situ protection system using the teaching of the present invention to modify and customize the building protection to suit the needs of each individual tenant, or the individual work stations of such tenant.

Figure 12:
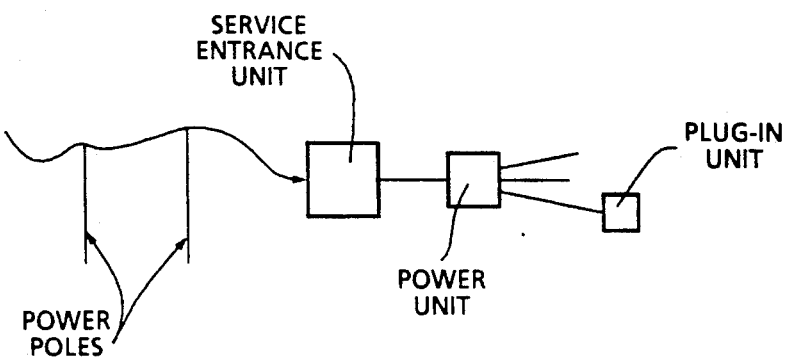
FIG. 12 illustrates a specific application of the present invention.

A specific application of the present invention will include a unit at the service entrance, a unit at a panel and a plug-in unit such as shown in FIG. 12.

Furthermore, it is observed that one skilled in the art will recognize that various capacitor values, or various values of the other elements in the system, may be selected based on an anticipated noise frequency range and impedances anticipated at each point. Thus, one skilled in the art will recognize that such elements may be scaled by the various transformer ratios described herein, and that active filter or connection elements may be used. Therefore, the present disclosure is not intended to be limiting, but an example only.

It is understood that while certain forms of the present invention have been illustrated and described herein, it is not to be limited to the specific forms or arrangements of parts described and shown.

I claim:

1. In a system wherein a-c power is supplied to a load from an a-c voltage source which includes a protector network disposed between said voltage source and said load, said protector network comprising a first voltage suppressor at the source side of said network connected across the supply lines from said source, a second voltage suppressor at the load side of said network connected across the supply lines to said load, the minimum breakdown voltage of said first suppressor being that voltage, above which would damage the load, whereby the breakdown of the first voltage suppressor results in the voltage across the load being below that which would damage the load and protecting said load from power surges and voltage transients occurring at said source side; and filter means disposed between said first and second voltage suppressors for filtering the power to said load, said second voltage suppressor being effective to protect the load from conditions occurring at the load side, the improvement in combination therewith comprising:

said filter means being an inductive/capacitive type filter, said filter means including a line connecting said first and second voltage suppressors together with said line having a self-inductance, said line self-inductance being the only inductance of said filter means and attenuates high frequency disturbances.

2. The improvement defined in claim 1 wherein said a-c source is a utility power source, said line connecting said load to said source of utility power.

3. The improvement defined in claim 1 wherein said a-c source is a utility power source, said line connecting said load to said source of utility power.

4. The improvement defined in claim 1 further including a main panel connected to a source of power, and a plurality of point-of-use panels each connected to said main panel.

5. The improvement defined in claim 4 wherein each point-of-use panel includes a filter network.

6. The improvement defined in claim 5 wherein each point-of-use panel filter network includes a capacitor and a surge suppressor.

7. The improvement defined in claim 6 further including a capacitor connected between phase and neutral buses on the main panel.

8. The improvement defined in claim 1 including a plurality of filter means connected across the supply lines to protect the first voltage suppressor from voltage surges generated on the load side of the network.

9. In a system wherein a-c power is supplied to a load from an a-c voltage source via a transformer having a transformer ratio and which includes a protector network disposed between said voltage source and said load, said protector network comprising a first voltage suppressor at the source side of said network connected across the supply lines from said source, a second voltage suppressor at the load side of said network connected across the supply lines to said load, the minimum breakdown voltage of said first suppressor being that voltage, above which would damage the load, whereby the breakdown of the first voltage suppressor results in the voltage across the load being below that which would damage the load and protecting said load from power surges and voltage transients occurring at said source side; and filter means disposed between said first and second voltage suppressors for filtering the power to said load, said second voltage suppressor being effective to protect the load from conditions occurring at the load side, the improvement in combination therewith comprising:

said filter means being an inductive/capacitive type filter, said filter means including a line means connecting said first voltage suppressor to a source side of the transformer and connecting the load side of the transformer to said second voltage suppressor with said line having a self-inductance and the transformer having a series inductance, said line self-inductance and the transformer series inductance being the only inductances of said filter means and filtering high frequency noise, and all suppressor elements' breakdown voltage on the load side of the transformer being related to all suppressor elements' breakdown voltage on the source side of the transformer as multiples of the transformer ratio, regardless of the minimum breakdown voltage required by the continuous power voltages on each side of the transformer whereby a voltage surge or transient on the source side will activate the source side suppressor element and will not activate the load side voltage suppressor element.

10. The improvement defined in claim 9 wherein the transformer ratio is 1:Z, and the suppressor elements on the one side of the transformer have voltage breakdown values equal to or greater than Z times the voltage breakdown value of the suppressor elements on the other side of the transformer consistent with the winding ratio.

11. The improvement defined in claim 9 further including a plurality of point-of-use panels.

12. The improvement defined in claim 11 further including a filter network on each of said point-of-use panels.

13. The improvement defined in claim 12 wherein each of said point-of-use filter networks includes a voltage suppressor.

14. The improvement defined in claim 13 wherein each point-of-use panel filter network voltage suppressor on one side of the transformer is a multiple of a point-of-use panel filter network voltage suppressor on the other side of the transformer, with the multiple being the transformer ratio.

15. The improvement defined in claim 14 wherein each point-of-use panel filter network voltage suppressor breakdown value on one side of the transformer is equal to or greater than the voltage breakdown value of a point-of-use panel filter network voltage suppressor on the other side of the transformer.

16. The improvement defined in claim 14 further including a capacitor connected between a phase bus and a neutral bus on each point-of-use panel.

17. The improvement defined in claim 9 wherein one side of said transformer forms a load side and the other side of the transformer forms a line side, and any voltage suppressor on the line side has a voltage suppression value as compared to a voltage suppression value of any voltage suppressor on said load side which causes said line side voltage suppressor to turn on before any load side voltage suppressor.

18. In a building-installed system wherein a-c power is supplied to a load located in the building from an a-c voltage source via a main panel and building wiring and which includes a protector network disposed between said voltage source and said load, said protector network comprising a first voltage suppressor at the source side of said network connected across the supply lines from said source, a second voltage suppressor at the load side of said network connected across the supply lines to said load, the minimum breakdown voltage of said first suppressor being that voltage, above which would damage the load, whereby the breakdown of the first voltage suppressor results in the voltage across the load being below that which would damage the load and protecting said load from power surges and voltage transients occurring at said source side; and filter means disposed between said first and second voltage suppressors for filtering the power to said load, said second voltage suppressor being effective to protect the load from conditions occurring at the load side, the improvement in combination therewith comprising:

said filter means being an inductive/capacitive type filter, said filter means including a building line connecting said first and second voltage suppressors together with said building line having a self-inductance, said line self-inductance being the only inductance of said filter means.

19. The improvement defined in claim 18 wherein the building wiring includes a bus bar riser connected to the main panel.

20. The improvement defined in claim 19 wherein the building further includes a plurality of point-of-use panels and each point-of-use panel is connected to the bus bar riser.

21. The improvement defined in claim 18 wherein the building includes a plurality of point-of-use panels and each point-of-use panel is connected to the main panel by wiring which is separate from wiring used to connect other point-of-use panels to the main panel.

22. The improvement defined in claim 18 further including a capacitor connected between a phase bus and a neutral bus on the main panel.

23. The improvement defined in claim 12 further including a plurality of additional protection units connected to the building wiring to protect equipment at various locations in the building and to protect said first suppressor element from voltage surges initiated in the building.

24. The improvement defined in claim 23 wherein each voltage suppressor element includes an MOV.

25. In a system wherein a-c power is supplied to a load from an a-c voltage source which includes a protector network disposed between said voltage source and said load, said protector network comprising a first voltage suppressor at the source side of said network connected across the supply lines from said source, a second voltage suppressor at the load side of said network connected across the supply lines to said load, the minimum breakdown voltage of said first suppressor being that voltage, above which would damage the load, whereby the breakdown of the first voltage suppressor results in the voltage across the load being below that which would damage the load and protecting said load from power surges and voltage transients occurring at said source side; and filter means disposed between said first and second voltage suppressors for filtering the power to said load, said second voltage suppressor being effective to protect the load from conditions occurring at the load side, the improvement in combination therewith comprising:

said filter means being an inductive type filter, said filter means including a line connecting said first and second voltage suppressors together with said line having a self-inductance, said line self-inductance being the only inductance of said filter means.

26. In a system wherein a-c power is supplied to a load from an a-c voltage source which includes a protector network disposed between said voltage source and said load, said protector network comprising a first voltage suppressor at the source side of said network connected across the supply lines from said source, a second voltage suppressor at the load side of said network connected across the supply lines to said load, the minimum breakdown voltage of said first suppressor being that voltage, above which would damage the load, whereby the breakdown of the first voltage suppressor results in the voltage across the load being below that which would damage the load and protecting said load from power surges and voltage transients occurring at said source side; and filter means disposed between said first and second voltage suppressors for filtering the power to said load, said second voltage suppressor being effective to protect the load from conditions occurring at the load side, the improvement in combination therewith comprising:

said filter means being an inductive/capacitive type filter, said filter means including a line connecting said first and second voltage suppressors together with said line having a self-inductance, and a capacitor connected across the supply lines adjacent to said first voltage suppressor, said line self-inductance being the only inductance of said filter means.

27. The system defined in claim 26 further including a capacitor connected across the supply lines adjacent to said second voltage suppressor.

* * * * *